United States Patent [19]

Mette

[11] Patent Number: 4,549,830
[45] Date of Patent: Oct. 29, 1985

[54] FASTENING OF A SEALING BELLOWS TO THE JOINT HOUSING OF A BALL JOINT

[75] Inventor: Ulrich Mette, Essen, Fed. Rep. of Germany

[73] Assignee: TRW Ehrenreich GmbH & Co. KG, Dusseldorf, Fed. Rep. of Germany

[21] Appl. No.: 667,880

[22] Filed: Nov. 2, 1984

[30] Foreign Application Priority Data

Nov. 22, 1983 [DE] Fed. Rep. of Germany ....... 3341993

[51] Int. Cl.$^4$ .............................................. F16C 11/06
[52] U.S. Cl. ..................................... 403/134; 403/51; 277/212 FB
[58] Field of Search ........................... 403/50, 51, 134; 277/212 FB, 212 F, 215, 213, 214; 74/473 P, 18.1, 18, 18.2

[56] References Cited

U.S. PATENT DOCUMENTS 2,472,540 10/1969 Gottschald ............................ 403/51
3,292,957 12/1966 Ulderup ............................... 403/134
4,134,596 1/1979 Kawai et al. ..................... 277/214 X Primary Examiner—Andrew V. Kundrat
Attorney, Agent, or Firm—Yount & Tarolli

[57] ABSTRACT

The subject of the invention is the fastening of a sealing bellows to the joint housing of a ball joint, in which the housing-side rim of the sealing bellows is laid firmly into a ring groove circumscribing the joint housing, designed substantially U-shaped in cross section, the bellows rim having a profiling adapted to the U-shape of the ring above and being pressed into the ring groove by a clamp ring. To increase the sealing effect, it is proposed that the profiled zone of the bellows rim lying opposite the bottom of the ring groove forms, when drawn on by the tension ring, a fold lifting off from the bottom of the groove, arched upward, which stretches under the pressure of the clamp ring to force the bellows rim against the side walls of the groove.

2 Claims, 3 Drawing Figures

FASTENING OF A SEALING BELLOWS TO THE JOINT HOUSING OF A BALL JOINT

The subject of the invention is the fastening of a sealing bellows to the joint housing of a ball joint, in which the housing-side rim of the sealing bellows is laid firmly into a substantially U-shaped groove circumscribing the joint housing, the rim of the bellows having a profiling adapted to the U-form of the circular groove, and being pressed into the sealing groove by a clamp ring.

From German Pat. No. 1,525,083 there is known an elastic sealing ring in bellows form for ball joints movable in all directions, in which the housing-side rim of the sealing bellows is laid firmly, by a clamp ring, in a circular groove running around the joint housing.

Also known, from German Pat. No. 2,625,507, is a similar fastening for the sealing bellows, in which the clamp ring consists of several individual wires twisted together. Such fastenings only assure an adequate sealing when the specific surface pressure of the sealing bellows is sufficiently great, in the zone of the circular groove, against the joint housing. Narrow limits are set for an increase of this specific surface pressure by increasing the tension force of the clamp ring, because the sealing bellows may then be crushed or destroyed.

Starting from this, the invention attacks the problem of providing a fastening of a sealing bellows to the joint housing of a ball joint with a clamp ring clamping into a circular groove running around the joint housing, which has an improved sealing effect without increasing the clamping force of the tension ring in comparison with the known fastenings.

For the technical solution of this problem, a fastening is proposed in which the profiled zone of the bellows rim, lying opposite the bottom of the circular groove, in the tightened condition, forms a circumferential fold, lifting off from the bottom of the groove, arched outward, which stretches under the pressure of the clamp ring.

In such a fastening, the inventive idea consists of producing, with the fold, without a thickening of the wall thickness of the sealing bellows, an increase of material over the bottom of the circular groove, and then squeezing the latter, with the clamp ring, into the circumferential ring gap between clamp ring and housing. In this way, there is obtained, on the one hand, an elastic contact of the sealing bellows in the ring groove against the joint housing, and on the other hand, at the same time, an increase of the specific surface pressure into the turning zone of the sealing bellows (the side walls of the groove) on both sides of the clamp ring.

In one practical embodiment, a further improvement of the sealing effect is possible by the fact that the inner side of the rim of the sealing bellows, on a section turned toward the joint housing and directed upward from the bottom of the ring groove, is provided with channels which provide a labyrinth seal.

BRIEF DESCRIPTION OF THE DRAWINGS

Other details and advantages of the subject of the invention are given from the description which follows of the respective drawings, in which has been represented one preferred form of execution of a fastening designed according to invention.

DETAILED DESCRIPTION

Figure 1:
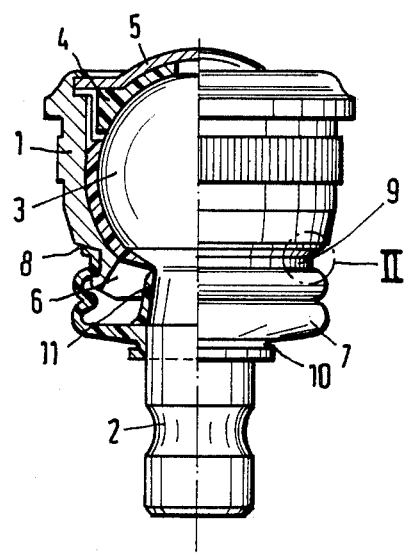
FIG. 1 shows a ball joint, partly in section (left half) and partly in top view (right half)
Figure 2:
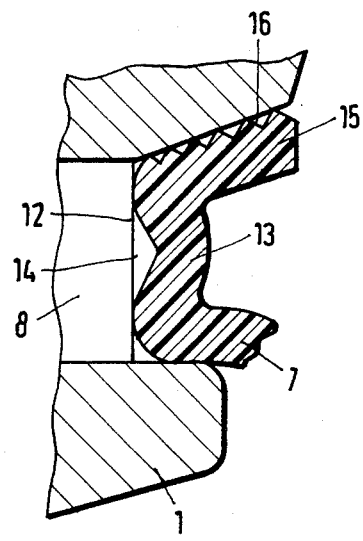
FIG. 2 shows an enlarged section of the ring groove of the joint housing, with the sealing bellows tightened, without clamp ring, in cross section.
Figure 3:
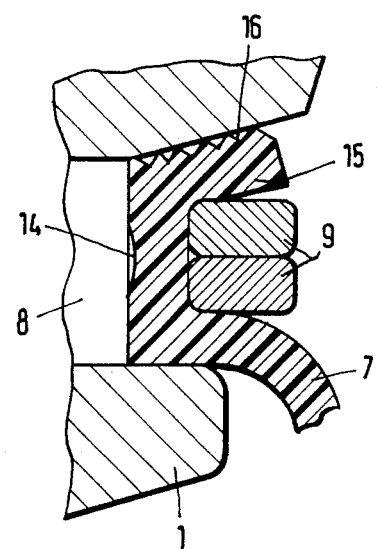
FIG. 3 shows the same section with the clamp ring set in place.

The ball joint consists of a joint housing 1 with a ball pin 2, movable to all sides, disposed therein, and a bearing shell 4 set in between the joint housing 1 and a ball head 3. The joint housing 1 is closed at its upper side with a rolled-in cap 5.

An opening 6, necessary for reasons of functionality, between the joint housing 1 and the ball pin 2, is sealed with a sealing bellows 7, which engages, on the housing side, in a circumferential ring groove 8, and is fastened there with a clamp ring 9. On the pin side, the sealing bellows 7 is also fastened with a clamp ring 10. Inside the sealing bellows 7 there is arranged, on the ball pin 2, a support socket 11, which, on the one hand, prevents the sliding upward of the sealing bellows 7, and on the other hand, in case of extreme joint deflection, acts as a buffer between the joint housing 1 and the ball pin 2.

On the housing-side rim, the sealing bellows 7 has a profiling adapted to the circumferential ring groove 8. This profiling is so shaped that when the bellows is in the drawn-on condition, that is, set into the ring groove 8, at the bottom 12 of the ring groove 8, an outward-directed fold 13 is formed. Thus there results between the bottom 12 of the ring groove 8 and the inner side of the sealing bellows 7, a hollow space 14. Upon setting in place the clamp ring 9, the fold 13 is stretched, with reduction or removal of the hollow space 14. In this way, the excess material of the sealing bellows 7 is squeezed against the side walls of the ring groove 8 and in the ring spaces on both sides of the clamp ring 9 into the joint housing 1. In these areas of relative motion, increased specific surface pressures result, which effects the desired improvement of the seal.

The sealing bellows 7 is provided on the inside, on its rim 15 lying against the joint housing 1, with channels 16, which form a labyrinth seal.

I claim:

1. Apparatus for fastening a sealing bellows to a joint housing of a ball joint, in which the housing-side rim of the sealing bellows is set firmly into a substantially U-shaped ring groove circumscribing the joint housing, wherein the bellows rim has a profiling adapted to the U shape of the ring groove and is clamped into the ring groove by a clamp ring, characterized in that the profiled zone of the bellows rim lying opposite the bottom of the ring groove forms, in the groove, a circumferential fold spacedfrom the bottom of the groove and arched outwardly and which stretches under the radial pressure of the clamp ring.

2. Apparatus according to Claim 1, characterized in that the contact surface of the profiled bellows rim which is axially outwardly of the sealing bellows and lies opposite a side surface of the ring groove, includes a plurality of channels which form a labyrinth seal.

* * * * *